(12) United States Patent
Iasella et al.

(10) Patent No.: US 8,648,699 B2
(45) Date of Patent: Feb. 11, 2014

(54) ITEM TRACKING SYSTEM AND ARRANGEMENT

(75) Inventors: Gino N. Iasella, Gibsonia, PA (US);
Timur P. Sriharto, Monroeville, PA (US)

(73) Assignee: Mobile Aspects, Inc., Pittsburgh, PA (US)

( * ) Notice: Subject to any disclaimer, the term of this patent is extended or adjusted under 35 U.S.C. 154(b) by 710 days.

(21) Appl. No.: 12/838,801

(22) Filed: Jul. 19, 2010

(65) Prior Publication Data
US 2012/0013444 A1 Jan. 19, 2012

(51) Int. Cl.
*H04Q 5/22* (2006.01)

(52) U.S. Cl.
USPC .............. 340/10.1; 340/568.1; 340/568.2; 340/572.1; 705/28

(58) Field of Classification Search
USPC .......................................... 340/570
See application file for complete search history.

(56) References Cited

U.S. PATENT DOCUMENTS

| | | |
|---|---|---|
| 3,958,102 A | 5/1976 | Burt |
| 4,116,512 A | 9/1978 | Wiser |
| 4,118,693 A | 10/1978 | Novikoff |
| 4,227,037 A | 10/1980 | Layton |
| 4,496,406 A | 1/1985 | Dedow |
| 4,636,634 A | 1/1987 | Harper et al. |
| 4,636,950 A | 1/1987 | Caswell et al. |
| 4,673,932 A | 6/1987 | Ekchian et al. |
| 4,847,764 A | 7/1989 | Halvorson |
| 4,860,918 A | 8/1989 | Wuyten et al. |
| 5,029,183 A | 7/1991 | Tymes |
| 5,194,856 A | 3/1993 | Zijlstra |
| 5,287,414 A | 2/1994 | Foster |
| 5,295,154 A | 3/1994 | Meier et al. |
| 5,389,919 A | 2/1995 | Warren et al. |
| 5,408,443 A | 4/1995 | Weinberger |
| 5,410,315 A | 4/1995 | Huber |
| 5,413,236 A | 5/1995 | Kenevan |
| 5,431,299 A | 7/1995 | Brewer et al. |
| 5,495,961 A | 3/1996 | Maestre |

(Continued)

FOREIGN PATENT DOCUMENTS

| | | |
|---|---|---|
| JP | 2001052054 A | 2/2001 |
| JP | 20020282200 A | 10/2002 |

OTHER PUBLICATIONS

U.S. Appl. No. 11/474,773, filed Jun. 26, 2006.
U.S. Appl. No. 12/240,022, filed Sep. 29, 2008.

(Continued)

*Primary Examiner* — Daniel Wu
*Assistant Examiner* — Frederick Ott
(74) *Attorney, Agent, or Firm* — The Webb Law Firm

(57) ABSTRACT

An item tracking system including at least one signal emitting element directly or indirectly attached to a portion of at least one item, wherein at least a portion of the at least one signal emitting element extends from the at least one item. The system further includes a container, including: (i) a support surface configured to at least partially support the at least one item and having at least one opening extending therethrough, which is configured to at least partially receive at least a portion of the signal emitting element therethrough; and (ii) at least one signal receiving member configured for communication with the portion of the at least one signal emitting member extending through the at least one opening. An item tracking container and method of tracking are also disclosed.

23 Claims, 2 Drawing Sheets

(56) References Cited

U.S. PATENT DOCUMENTS

| | | | |
|---|---|---|---|
| 5,565,858 | A | 10/1996 | Guthrie |
| 5,689,238 | A | 11/1997 | Cannon, Jr. et al. |
| 5,713,485 | A | 2/1998 | Liff et al. |
| 5,729,697 | A | 3/1998 | Schkolnick et al. |
| 5,739,765 | A | 4/1998 | Stanfield et al. |
| 5,751,220 | A | 5/1998 | Ghaffari |
| 5,751,221 | A | 5/1998 | Stanfield et al. |
| 5,765,707 | A | 6/1998 | Kenevan |
| 5,771,003 | A | 6/1998 | Seymour |
| 5,774,053 | A | 6/1998 | Porter |
| 5,774,059 | A | 6/1998 | Henry et al. |
| 5,797,515 | A | 8/1998 | Liff et al. |
| 5,801,628 | A | 9/1998 | Maloney |
| 5,804,810 | A | 9/1998 | Woolley et al. |
| 5,857,152 | A | 1/1999 | Everett |
| 5,912,818 | A | 6/1999 | McGrady et al. |
| 5,917,433 | A | 6/1999 | Keillor et al. |
| 5,936,527 | A | 8/1999 | Isaacman et al. |
| 5,950,630 | A | 9/1999 | Portwood et al. |
| 5,993,046 | A | 11/1999 | McGrady et al. |
| 6,075,441 | A | 6/2000 | Maloney |
| 6,112,502 | A | 9/2000 | Frederick et al. |
| 6,116,461 | A | 9/2000 | Broadfield et al. |
| 6,127,928 | A | 10/2000 | Isaacman et al. |
| 6,204,764 | B1 | 3/2001 | Maloney |
| 6,296,148 | B1 | 10/2001 | Myers et al. |
| 6,323,782 | B1 | 11/2001 | Stephens et al. |
| 6,392,544 | B1 | 5/2002 | Collins |
| 6,407,665 | B2 | 6/2002 | Maloney |
| 6,424,262 | B2 | 7/2002 | Garber et al. |
| 6,445,297 | B1 | 9/2002 | Nicholson |
| 6,512,459 | B2 | 1/2003 | Benezech et al. |
| 6,512,478 | B1 | 1/2003 | Chien |
| 6,677,857 | B2 | 1/2004 | Bara et al. |
| 6,703,935 | B1 | 3/2004 | Chung et al. |
| 6,707,381 | B1 * | 3/2004 | Maloney .............. 340/568.1 |
| 6,714,121 | B1 | 3/2004 | Moore |
| 6,718,888 | B2 | 4/2004 | Muirhead |
| 6,745,027 | B2 | 6/2004 | Twitchell, Jr. |
| 6,747,558 | B1 | 6/2004 | Thorne et al. |
| 6,750,771 | B1 | 6/2004 | Brand |
| 6,762,676 | B2 | 7/2004 | Teowee et al. |
| 6,826,514 | B1 | 11/2004 | Antico et al. |
| 6,870,464 | B2 | 3/2005 | Okamura |
| 6,927,688 | B2 | 8/2005 | Tice |
| 6,943,678 | B2 | 9/2005 | Muirhead |
| 6,989,749 | B2 | 1/2006 | Mohr |
| 7,009,518 | B2 | 3/2006 | Liao et al. |
| 7,088,229 | B2 | 8/2006 | Johnson |
| 7,098,784 | B2 | 8/2006 | Easley et al. |
| 7,126,926 | B1 | 10/2006 | Bjorklund et al. |
| 7,130,773 | B1 | 10/2006 | Wong |
| 7,152,791 | B2 | 12/2006 | Chappidi et al. |
| 7,187,287 | B2 | 3/2007 | Ryal |
| 7,233,620 | B2 | 6/2007 | Brommer |
| 7,256,682 | B2 | 8/2007 | Sweeney, II |
| 7,265,675 | B1 | 9/2007 | Carrender et al. |
| 7,286,043 | B2 | 10/2007 | Carrender et al. |
| 7,298,243 | B2 | 11/2007 | Juels et al. |
| 7,310,045 | B2 | 12/2007 | Inui |
| 7,342,496 | B2 | 3/2008 | Muirhead |
| 7,348,884 | B2 | 3/2008 | Higham |
| 7,420,458 | B1 | 9/2008 | Kuzma et al. |
| 7,433,648 | B2 | 10/2008 | Bridgelall |
| 2001/0002448 | A1 * | 5/2001 | Wilson et al. .................. 700/233 |
| 2001/0028308 | A1 | 10/2001 | De La Huerga |
| 2001/0034613 | A1 | 10/2001 | Rubsamen |
| 2001/0044731 | A1 | 11/2001 | Coffman et al. |
| 2001/0052054 | A1 | 12/2001 | Franke et al. |
| 2002/0027507 | A1 | 3/2002 | Yarin et al. |
| 2002/0038167 | A1 | 3/2002 | Chirnomas |
| 2002/0063622 | A1 | 5/2002 | Armstrong et al. |
| 2002/0113082 | A1 | 8/2002 | Leatherman et al. |
| 2002/0143320 | A1 | 10/2002 | Levin |
| 2002/0145520 | A1 | 10/2002 | Maloney |
| 2002/0153411 | A1 | 10/2002 | Wan et al. |
| 2002/0183882 | A1 | 12/2002 | Dearing et al. |
| 2002/0190871 | A1 | 12/2002 | Stanfield et al. |
| 2003/0030539 | A1 | 2/2003 | McGarry et al. |
| 2003/0034390 | A1 | 2/2003 | Linton et al. |
| 2003/0117281 | A1 | 6/2003 | Sriharto |
| 2003/0160698 | A1 | 8/2003 | Andreasson et al. |
| 2003/0164401 | A1 | 9/2003 | Andreasson et al. |
| 2003/0174099 | A1 | 9/2003 | Bauer et al. |
| 2004/0046020 | A1 | 3/2004 | Andreasson et al. |
| 2004/0069850 | A1 | 4/2004 | De Wilde |
| 2004/0069852 | A1 | 4/2004 | Seppinen et al. |
| 2004/0111335 | A1 | 6/2004 | Black et al. |
| 2004/0155003 | A1 | 8/2004 | Anderson et al. |
| 2004/0168618 | A1 | 9/2004 | Muirhead |
| 2004/0267545 | A1 | 12/2004 | Buchmann et al. |
| 2005/0088284 | A1 | 4/2005 | Zai et al. |
| 2005/0088305 | A1 | 4/2005 | Greene et al. |
| 2005/0093679 | A1 | 5/2005 | Zai et al. |
| 2005/0237184 | A1 | 10/2005 | Muirhead |
| 2005/0241548 | A1 | 11/2005 | Muirhead |
| 2005/0280539 | A1 | 12/2005 | Pettus |
| 2006/0022800 | A1 | 2/2006 | Krishna et al. |
| 2006/0028081 | A1 | 2/2006 | Minagawa |
| 2006/0056370 | A1 | 3/2006 | Hancock et al. |
| 2006/0058018 | A1 | 3/2006 | Toulis et al. |
| 2006/0092040 | A1 | 5/2006 | Fishkin et al. |
| 2006/0109084 | A1 | 5/2006 | Yarvis |
| 2006/0143439 | A1 | 6/2006 | Arumugam et al. |
| 2006/0187043 | A1 | 8/2006 | Allen |
| 2006/0215593 | A1 | 9/2006 | Wang et al. |
| 2007/0046467 | A1 | 3/2007 | Chakraborty et al. |
| 2007/0096876 | A1 | 5/2007 | Bridgelall et al. |
| 2007/0103303 | A1 | 5/2007 | Shoarinejad |
| 2007/0164109 | A1 | 7/2007 | Ridings et al. |
| 2007/0171992 | A1 | 7/2007 | Shameli et al. |
| 2007/0172007 | A1 | 7/2007 | Shoarinejad et al. |
| 2007/0188342 | A1 | 8/2007 | Valeriano et al. |
| 2007/0200724 | A1 | 8/2007 | Lazo et al. |
| 2008/0061940 | A1 | 3/2008 | Onderko et al. |
| 2008/0117050 | A1 | 5/2008 | Wu et al. |
| 2008/0198016 | A1 | 8/2008 | Lawrence et al. |
| 2008/0218354 | A1 | 9/2008 | Lorentz et al. |
| 2009/0261956 | A1 | 10/2009 | Ojeda et al. |

OTHER PUBLICATIONS

U.S. Appl. No. 12/607,732, filed Oct. 28, 2009.

* cited by examiner

ITEM TRACKING SYSTEM AND ARRANGEMENT

BACKGROUND OF THE INVENTION

1. Field of the Invention

The present invention relates generally to an item and/or object tracking system and arrangement, and in particular to an item tracking system and arrangement for use in tracking and managing items and/or objects associated with a signal emitting element, such as a tag, a radio frequency identification tag, a transponder, and the like.

2. Description of the Related Art

In the field of item and/or object tracking, various systems and arrangements have been developed to effectively and accurately track an item, as well as some characteristic or data associated with the item. For example, and as is known in the art, an item can be "tagged" with a signal emitting element that transmits a signal including specific data. This data can be used to track the item, control the flow of items in the system, locate the item amongst multiple items, make decisions regarding the dispensing, movement, purchase, or other action related to the item (or group of items with a similar characteristic), etc. For example, one such item tracking system is shown and described in U.S. patent application Ser. No. 12/240,022, entitled "Dynamic Control Containment Unit," the entirety of which is incorporated herein by reference. Such tracking systems are useful in connection with tracking various items that are placed within or removed from a specifically-configured containment or storage structure.

There are different types of signal emitting elements, including tag members, radio frequency identification members, transponders, and the like. Some of these members are active, i.e., continuously or periodically "wake-up" and transmit information and data for receipt by some signal receiving member, or passive, i.e., remain dormant until activated by some other device or member, such as a "wake-up-and-transmit" signal from a signal receiving member. As stated, both types of tag members may be used in connection with a tracking system.

However, certain items and/or objects are not amenable to the use of such existing tag members. For example, certain items are too thin or too flimsy to be positioned in a container, e.g., a drawer or a shelf, and effectively tagged, where the system can read the tag and obtain the necessary data. Accordingly, a tag has been developed that can be attached to and extend from a surface of such an item, such as the "flag tag" used by Mobile Aspects, Inc., which has been used in connection with the above-referenced "Dynamic Control Containment Unit" and associated system. Using such an extending tag allows for a thin or flimsy item to be associated with a tag; however, the issues of accuracy and interference are still present.

Currently, in order to effectively identify and establish a data exchange between the signal emitting members, e.g., tag members, and the signal receiving member, e.g., an antenna or the like, a complex and configured structure is required. Further, even such a specialized configuration may not effectively identify all of the tags (and, thus, the associated items) in the containment area based upon the random positioning of the tags. For example, the items may be too close together, thus leading to the contact or close proximity of adjacent tag members. In addition, when the item includes metallic components or features, data emission and receipt from and to the tag will be subject to interference. Therefore, the accuracy of the tracking process may be compromised.

There is considerable room for improvement in the accuracy and effectiveness of item tracking systems, which are deployed throughout many industries and in numerous environments. There is also a need for an item tracking system and arrangement that can be used in connection with specifically-sized or -shaped items and/or objects. In addition, there is a need for an item tracking system and arrangement that can maintain accuracy regardless of the materials used by or integrated with the item-to-be-tracked.

SUMMARY OF THE INVENTION

Generally, the present invention provides an item tracking system and arrangement that overcomes or addresses some or all of the deficiencies and drawbacks associated with the prior art. Preferably, and in some preferred and non-limiting embodiments, the present invention provides an item tracking system and arrangement that can be effectively used in connection with specifically-sized or -shaped items and/or objects. Preferably, and in other preferred and non-limiting embodiments, the present invention provides an item tracking system and arrangement that maintains accuracy regardless of the materials used by or integrated with the item-to-be-tracked, for example metallic components or materials.

Accordingly, and in one preferred and non-limiting embodiment, the present invention is directed to an item tracking system including at least one signal emitting element directly or indirectly attached to a portion of at least one item, wherein at least a portion of the at least one signal emitting element extends from the at least one item. The system further includes a container, including: (i) a support surface configured to at least partially support the at least one item and having at least one opening extending therethrough, which is configured to at least partially receive at least a portion of the signal emitting element therethrough; and (ii) at least one signal receiving member configured for communication with the portion of the at least one signal emitting member extending through the at least one opening.

In another preferred and non-limiting embodiment, the present invention is directed to an item tracking container, including: a support surface configured to at least partially support at least one item and having at least one opening extending therethrough, which is configured to at least partially receive therethrough at least a portion of a signal emitting element directly or indirectly attached to a portion of at least one item; and (ii) at least one signal receiving member configured for communication with the portion of the at least one signal emitting member extending through the at least one opening.

In a further preferred and non-limiting embodiment, the present invention is directed to a method of tracking at least one item having at least one signal emitting element attached to at least a portion thereof. The method includes: positioning at least a portion of the at least one signal emitting element through at least one opening extending through a support surface configured to at least partially support the at least one item thereon; and communicating, by at least one signal receiving member, with the portion of the at least one signal emitting extending through the at least one opening.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
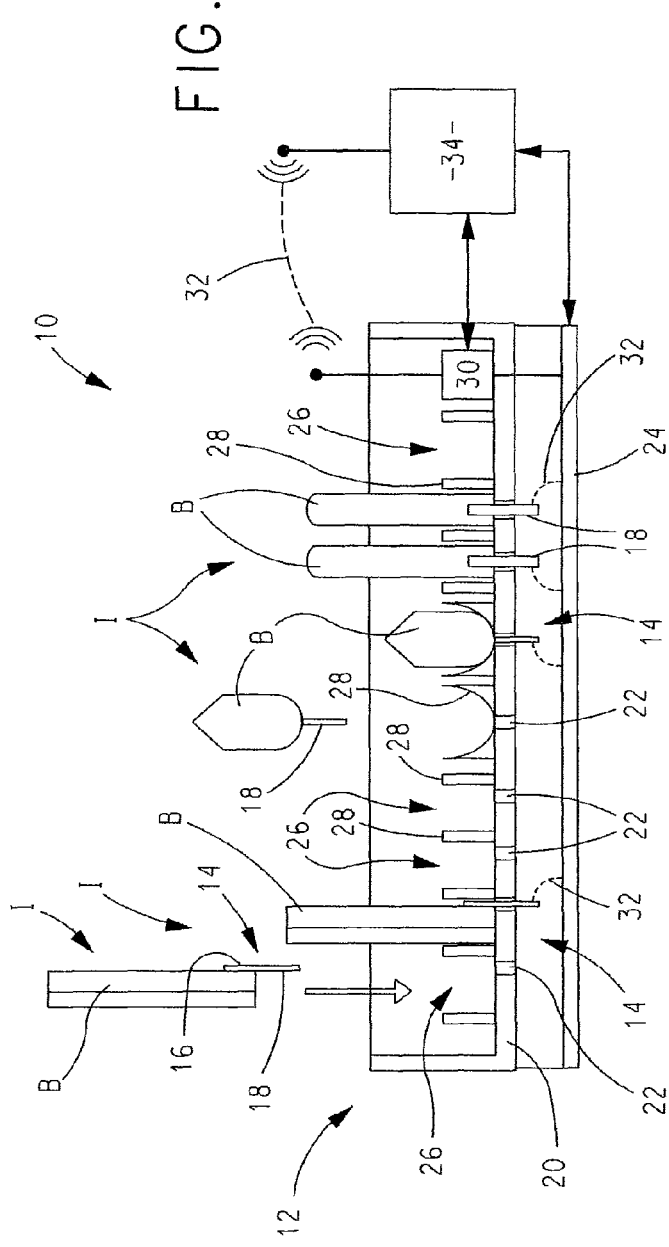
FIG. 1 is a schematic view of one embodiment of an item tracking system and arrangement according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present invention is directed to an item tracking system 10 and an item tracking container 12 for use in tracking, locating, or otherwise identifying one or more items I. Certain preferred and non-limiting embodiments of the item tracking system 10 and item tracking container 12 of the present invention are illustrated in FIGS. 1-8. Further, it should be noted that the item tracking system 10 and container 12 of the present invention are not limited to any particular item I, and can accommodate variously-configured, -sized, and -shaped items I.

Still further, the item tracking system 10 and container 12 of the present invention include the ability to uniquely identify the item I in an environment by using signal identification, transmission, receipt, and processing functions, and should not be limited to any particular type of signal processing system or infrastructure. In one preferred and non-limiting embodiment, the item tracking system 10 and container 12 of the present invention are utilized in connection with a radio frequency identification (RF/ID) environment. However, other similar signal tracking arrangements may be utilized without departing from the spirit and scope of the presently-invented item tracking system 10 and container 12.

Any wireless data transfer and communication architecture can serve as the basis of the present invention. For example, the system 10 and container 12 of the present invention can be configured for effective use in a bar code system, an optical character recognition system, an image recognition system, or the like. Accordingly, any system that permits the emission, sensing, and/or receipt of a signal associated with or containing data can be used or implemented within the context of the present invention.

Still further, the present invention may be used to manage and track items I that have a specific configuration, size, or shape, including, but not limited to, flimsy items I, thin items I, items I that contain metallic components or features, items I that are contained in metallic packaging, etc. In particular, it is one object of the present invention to provide an item tracking system 10 and container 12 that can be used in an RF/ID environment and still accurately and consistently identify the item I, based at least in part upon the signals and data associated therewith. Still further, and in some preferred and non-limiting embodiments of the present invention, the system 10 and container 12 are arranged to displace or space the tag (or signal emitting element) from the body of the item I (or packaging containing the item I) when the item I or packaging includes metallic portions. Accordingly, the system 10 and arrangement of the present invention assist in reducing the "de-tuning" effect on the radio frequency field, which is a known issue that may arise when interacting with metallic components in an RF/ID environment.

Figure 2:
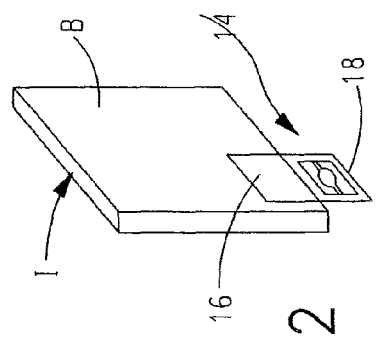
FIG. 2 is a schematic view of one embodiment of an item and signal emitting element in an item tracking system and arrangement according to the principles of the present invention.

With reference to FIG. 1, and in one preferred and non-limiting embodiment, the item tracking system 10 includes a signal emitting element 14 that is directly or indirectly attached to a portion of an item I. In addition, the signal emitting element 14 includes an attaching portion (or area) 16 and a signal emitting portion (or area) 18. In particular, and as illustrated in FIG. 2, the attaching portion 16 of the signal emitting element 14 is permanently or removably attached to some portion of the body B of the item I. For example, the attaching portion 16 may be adhesively attached thereto. Of course, the signal emitting element 14 may be integrated or incorporated with the body B of the item I, or formed as part of or attached to the packaging of the item I. Still further, the attaching portion 16 may be inserted into a pocket formed on the side of the item I or packaging associated with the item I. The signal emitting portion 18 of the signal emitting element 14 includes the appropriate operative components for transmitting data that is stored thereon.

It is envisioned that the signal emitting element 14 can be an "active" tag or a "passive" tag, as discussed above in connection with the known prior art. In addition, the data that is stored on the signal emitting element 14 can be embedded therein, programmed thereon, or otherwise associated with the signal emitting element 14. In addition, this data may include item data, packaging data, item grouping data, characteristics of the item, identification of the item, location data, interaction data, expiry data, condition data, alert data, signal emitting element data, system data, container data, or any other information that would be useful in managing and tracking items I in the system 10.

With continued reference to FIG. 1, the item tracking system 10 includes a container 12 (as discussed above). This container 12 may take a variety of forms, including a shelf, a drawer, a support structure, a containment unit, and the like. In addition, this container 12 includes a at least one support surface 20 that is sized and shaped so as to at least partially support the items I (or packaging) thereon. Further, the support surface 20 includes at least one (and typically many) openings 22 extending therethrough. These openings 22 are sized and shaped so as to at least partially receive at least a portion of the signal emitting element 14 therethrough. In particular, and in one preferred and non-limiting embodiment, at least a sufficient portion of the signal emitting portion 18 of the signal emitting element 14 will extend through the opening 22.

As also illustrated in FIG. 1, the container 12 (and/or the item tracking system 10) includes at least one signal receiving member 24 that is positioned at least partially below the support surface 20. This signal receiving member 24 is configured for communication with the portion of the signal emitting element 14 that extends through the opening 22. In this manner, the signal receiving member 24 is capable of transmitting and/or receiving data from the signal emitting element 14 (which is associated with or directly or indirectly attached to the item I). This signal receiving member 24 may take a variety of forms, and in one preferred and non-limiting embodiment, the signal receiving member 24 is in the form of one or more antennas, while the signal emitting element 14 is in the form of an RF/ID tag. Based upon the unique arrangement of extending the signal emitting element 14 at least partially through the opening 22 of the support surface 20 of the container 12, together with the positioning of the signal receiving member 24 (e.g., under the support surface 20), an accurate and consistent tracking process is provided.

In the preferred and non-limiting embodiment of FIG. 1, the support surface 20 includes multiple slots 26 that are created and defined by sidewalls 28. These slots 26 may also be defined as recesses in a flat support surface 20. Regardless, the slots 26 are used to specifically position the item I on the support surface 20, and, thus, the signal emitting element 14 associated with the item I. As further seen in FIG. 1, the sidewalls 28 may form a square-shaped or rectangular-shaped slot 26, or a rounded or circular slot 26. The size and configuration of the slots 26 is dependent upon the shape of the item I, the signal emitting element 14, and/or the packaging of the item I.

With further reference to FIG. 1, the item tracking system 10 may include a local controller 30 that is in communication with the signal receiving member 24. In particular, this local controller 30 can be used to communicate with and control the signal receiving member 24 in order to obtain, process, and/or transmit data, such as item data 32. Specifically, the item data 32 that is collected by the signal receiving member 24 can then be used in connection with the item tracking system 10 and/or the container 12 for uniquely identifying and tracking the item I, as well as other data associated with the item I. In addition, the local controller 30 may control various other features and functions associated with the container 12, such as access, authorization, security, alerts, lighting, and the like.

A central controller 34 may also be used, and this central controller 34 may include any of the above functions. Further, the central controller 34 may be used in managing multiple containers 12 within the item tracking system 10. Accordingly, the central controller 34 may be positioned remote from one or more of the containers 12, and in wireless (or hard-wired) communication with the local controller 30 and/or the signal receiving member 24. Any type of communication between the various components of the container 12, as well as within the system 10, is envisioned.

Figure 3:
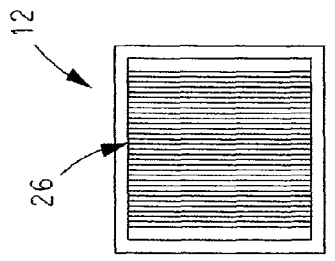
FIG. 3 is a plan view of one embodiment of a container in an item tracking system and arrangement according to the principles of the present invention.

As seen in FIG. 3, the support surface 20 may include multiple and aligned slots 26 for use in supporting multiple, thin items I (or packages associated with the items I). Further, the openings 22 are specifically arranged in connection with the slots 26, such that the item I (or packaging) is appropriately supported on the support surface 20 with the associated signal emitting element 14 extending through the opening 22.

Figure 4:
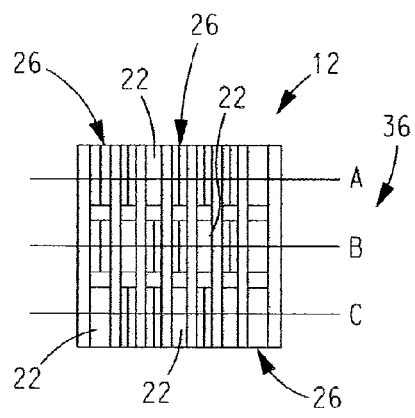
FIG. 4 is a plan view of another embodiment of a container in an item tracking system and arrangement according to the principles of the present invention.

FIG. 4 illustrates a further preferred and non-limiting embodiment where the openings 22 are specifically positioned to create lanes 36, such as lanes A, B, and C. Further, the openings 22 are staggered, thus ensuring that the signal emitting elements 14 positioned on the items I are not touching or detrimentally close to each other. In addition, the signal receiving member 24 may be programmed to only read certain lanes 36 based upon the presence of a signal emitting element 14 extending through an opening 22 in a particular lane 36. Accordingly, certain portions of the signal receiving member 24 (or, alternatively, separate signal receiving members 24) can be turned "on" or "off" based upon the presence of a signal emitting element 14 in a specified lane 36.

Figure 5:
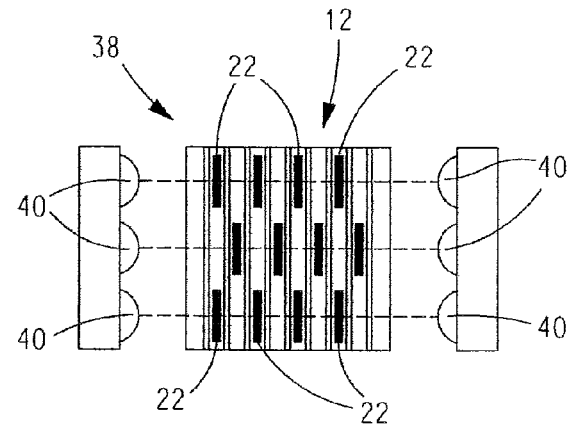
FIG. 5 is a schematic view of another embodiment of an item tracking system and arrangement according to the principles of the present invention.

With reference to FIG. 5, and in order to detect which lane 36 includes the presence of one or more signal emitting elements 14 (or, generally, through which opening 22 a signal emitting element 14 extends), an optical sensing arrangement 38 can be used. In particular, each lane 36 would be associated with one or more sensors 40 that are programmed to detect the presence of a signal emitting element 14 in the associated lane 36. If one or more signal emitting elements 14 are sensed in the associated lane 36, that portion of the signal receiving member 24 (or that specified signal receiving member 24) would be activated in the tracking process. However, if no signal emitting elements 14 were detected in that lane 36 of a particular sensor 40, that portion of the signal receiving member 24 (or the specific signal receiving member 24) would not need to be activated. This leads to faster scan speeds during the tracking process.

In addition, any appropriate sensing arrangement and configuration may be used to determine the presence of a signal emitting element 14 extending through an opening 22 (or slot). Such a sensing arrangement may include a physically-activatable switch, a transducer, a capacitor, a conductive element, or the like. As discussed, this provides a faster scanning process.

Still further, the local controller 30, the central controller 34, or some other programmable component of the system 10 could be configured to scan specified portions or areas of the container 12. As discussed above, the instructions to only scan or read the signal emitting elements 14 in a specified portion or area may be based upon the presence of one or more signal emitting elements 14 in the lanes 36 (or other designated area or portion in the container 12). Such an instruction may also be determined based upon other data available to the local controller 30 and/or central controller 34. For example, if specific items I are placed only in specific areas or portions of the support surface 20, and only these specific items I need to be tracked or scanned at some point in time, then the scanning area of the signal receiving member 24 could be reduced and specified. This also provides much faster scanning times within the system 10, thus yielding greater efficiencies in the tracking process.

Figure 6:
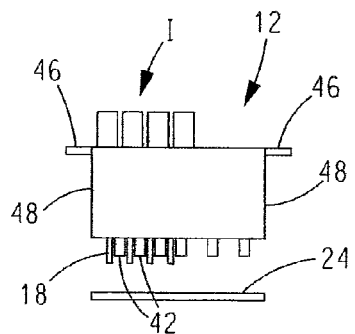
FIG. 6 is a schematic view of a further embodiment of an item tracking system and arrangement according to the principles of the present invention.

A further preferred and non-limiting embodiment of the present invention is illustrated in FIG. 6. In this embodiment, one or more spacers 42 are included on and extend from a bottom 44 of the support surface 20. In this embodiment, a spacer 42 is positioned between adjacent openings 22, and therefore between adjacent signal emitting elements 14. The use of such spacers 42 may assist in separating the signal emitting elements 14, and keep them in a specific orientation, e.g., a vertical orientation. By enforcing a specific orientation, the accuracy of the "reading" process of the signal receiving member 24 is further enhanced. Still further, these spacers 42 may be electromagnetically inert and/or non-metallic, so as not to cause any interference in the "reading" process.

While the container 12 may take a variety of forms, in the preferred and non-limiting embodiment of FIG. 6, a ledge 46 may extend from one or more of sides 48 of the container 12. In this manner, the support surface 20 could be removably positioned within various types of containment units. In particular, the ledges 46 would rest on or bear against some other support structure or arrangement in an existing or modified containment structure. Any type of support and configuration functionality is envisioned.

Figure 7:
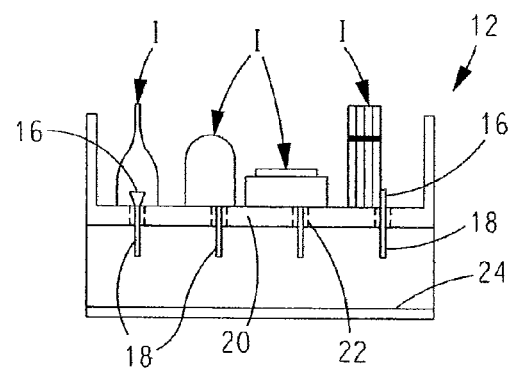
FIG. 7 is a schematic view of a still further embodiment of an item tracking system and arrangement according to the principles of the present invention.

As shown in FIG. 7, the item tracking system 10 and container 12 of the present invention can be used in connection with a variety of items I. In this preferred and non-limiting embodiment, and regardless of the size and/or shape of the item I (or packaging), the signal emitting elements 14 extend through the provided openings 22 in a specifically-oriented manner. In this manner, and again, regardless of the type of item I (or packaging), the appropriate orientation of the signal emitting element 14 is provided for use in quickly and accurately communicating with the signal receiving member 24.

Figure 8:
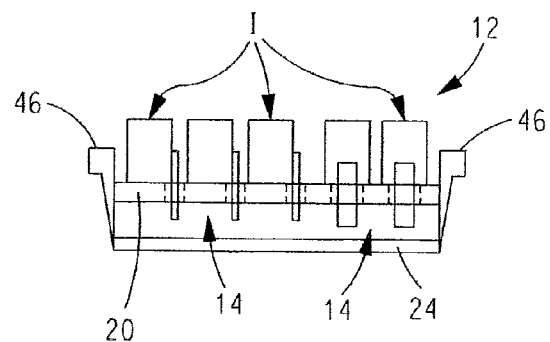
FIG. 8 is a schematic view of another embodiment of an item tracking system and arrangement according to the principles of the present invention.

A still further preferred and non-limiting embodiment of the present invention is illustrated in FIG. 8. In this embodiment, the openings 22 are positioned and oriented differently, e.g., at 90 degrees with respect to each other. Again, the use of specific orientation leads to greater functionality within the item tracking system 10, including the use of different signal receiving members 24, using predetermined lanes 36, or otherwise providing known orientation to increase accuracy of data exchange between the signal emitting elements 14 and the signal receiving member 24. In general, the use of the unique slots 26 and/or openings 22 "force" the orientation of the signal emitting element 14, which leads to greater efficiency, accuracy, and identification of failure points.

Accordingly, the present invention provides an item tracking system 10 and container 12 that is accurate and particularly useful in connection with specific types of items I (or packaging associated with such items I). Again, the slots 26 may be non-continuous, such that the signal emitting elements 14 can only be placed into specific areas on the support surface 20. For example, this "forced" orientation may ensure that the signal emitting elements 14 do not overlap with adjacent areas of the containment area, whether above or below the support surface 20. This reduces "tag shading" and/or interaction. As also discussed, spacers 42 can be used to optimally orient the signal emitting elements 14 for communication with the signal receiving member 24. Accordingly, the signal receiving member 24, such as an antenna, can also be optimized for the determined and known orientation of the signal emitting elements 14. By using lanes 36 and/or the optical sensing arrangement 38, activation of the signal receiving member 24 (or portions thereof) can be controlled, thereby increasing scan speeds.

In general, controlling the spatial separation between a metal surface (e.g., a surface or component of the item I (or packaging)) and the signal emitting elements 14, as well as the signal receiving member 24, ensures that the effect of the metal in a radio frequency environment is minimized. Accordingly, the item tracking system 10 and container 12 of the present invention represents an improvement on the current method of handling items with metal content or packaging without the need for complex modifications in container design. For example, the container 12 of the present invention can be used and easily positioned in connection with existing systems.

Still further, the present invention leverages gravity to deterministically set the distance between signal emitting elements 14 and the signal receiving member 24 at a fixed distance. The signal emitting elements 14 do not shade or interfere with each other, and very thin or "flimsy" items I (or associated packaging) can be tracked, since the signal emitting portion 18 of the signal emitting element 14 is appropriately managed and oriented. Further, mixed-sized and -shaped items I can be co-mingled on the same support surface 20, since the substrate does not impact the location of the signal emitting element 14.

In addition, shielding can be used in any portion of the container 12 in order to isolate the signal emitting portion 18 of the signal emitting element 14, and reduce or eliminate interference. Further, the support structure of the signal receiving member 24 may be made lightweight, as it is not required to support the weight of the items I positioned above it. Still further, the defined orientation of the signal emitting element 14 may permit the use of two-dimensional antennae, rather than the more complex and costly three-dimensional antennae. This will improve reading speed, lower costs, and improve manufacturability.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An item tracking system, comprising:
  a plurality of signal emitting elements directly or indirectly attached to a portion of each of a plurality of items having different shapes or sizes, wherein at least a portion of each of the plurality of signal emitting elements extends from an associated item of the plurality of items; and
  a container, comprising:
  (i) a support surface configured to at least partially support the plurality of items and having a plurality of openings extending therethrough, which are configured to at least partially receive at least a portion of each of the plurality of signal emitting elements therethrough; and
  (ii) at least one signal receiving member configured for wireless communication with the portion of each of the at least one signal emitting elements extending through the plurality of openings, wherein the plurality of openings are staggered and at least one spacer is positioned between adjacent openings, thereby enhancing the accuracy of a reading process of the at least one signal receiving member.

2. The system of claim 1, wherein the at least one signal receiving member is positioned at least partially below at least a portion of the support surface.

3. The system of claim 1, wherein at least one item of the plurality of items is at least one of the following: a flimsy item, a thin item, an item including at least one metallic component or portion, an item in a package, or any combination thereof.

4. The system of claim 1, wherein the communication between the at least one signal receiving member and each of the plurality of signal emitting elements is based upon radio frequency waves.

5. The system of claim 1, wherein each signal emitting element of the plurality of signal receiving emitting elements comprises:
   an attaching portion for direct or indirect attachment to at least one item; and
   a signal emitting portion configured for transmitting data.

6. The system of claim 5, wherein the attaching portion is at least one of: attachable to the at least one item, integrated with the at least one item, permanently attachable to the at least one item, removably attachable to the at least one item, attachable to packaging associated with the at least one item, integrated with packaging associated with the at least one item, permanently attachable to packaging associated with the at least one item, removably attachable to packaging associated with the at least one item, or any combination thereof.

7. The system of claim 1, wherein the container is at least one of the following: a shelf, a drawer, a support structure, a containment unit, or any combination thereof.

8. The system of claim 1, wherein each signal emitting element of the plurality of signal emitting elements is a radio frequency identification tag, and the at least one signal receiving member is at least one antenna.

9. The system of claim 1, wherein the support surface comprises a plurality of openings in the form of slots, each slot defined by at least one sidewall.

10. The system of claim 9, wherein at least a portion of the at least one sidewall is at least one of the following: square-shaped, rectangle-shaped, rounded, circular-shaped, or any combination thereof.

11. The system of claim 1, further comprising a local controller in communication with the at least one signal receiving member and configured to control at least one function of the at least one signal receiving member.

12. The system of claim 11, wherein the local controller is further configured to control at least one function of the container.

13. The system of claim 1, further comprising a central controller configured to communicate with and control at least one of the following: a local controller, at least one function of the container, at least one function of the at least one signal receiving member, at least one function of at least one signal emitting element of the plurality of signal emitting elements, or any combination thereof.

14. The system of claim 1, further comprising a plurality of openings arranged in a plurality of areas within the container.

15. The system of claim 14, wherein the at least one signal receiving member is configured to obtain data emitted from at least one signal emitting element of the plurality of signal emitting elements associated with at least one specific area of the plurality of areas within the container.

16. The system of claim 1, further comprising an sensing arrangement configured to sense the presence of the at least one signal emitting element extending through an opening.

17. The system of claim 1, further comprising at least one spacer extending from a surface of the support surface and positioned between adjacent openings.

18. An item tracking container, comprising:
   a support surface configured to at least partially support a plurality of items having different shapes and sizes, the support surface comprising a plurality of openings extending therethrough, the plurality of openings configured to at least partially receive therethrough at least a portion of each of a plurality of signal emitting elements directly or indirectly attached to a portion of at least one item of the plurality of items; and
   at least one signal receiving member configured for wireless communication with the portion of each of the plurality of signal emitting elements extending through the plurality of openings, wherein the plurality of openings are staggered and at least one spacer is positioned between adjacent openings, thereby enhancing the accuracy of a reading process of the at least one signal receiving member.

19. The container of claim 18, wherein the at least one item is at least one of the following: a flimsy item, a thin item, an item including at least one metallic component or portion, an item in a package, or any combination thereof.

20. A method of tracking a plurality of items having different shapes and sizes, each item of the plurality of items having at least one signal emitting element attached to at least a portion thereof, the method comprising:
   positioning at least a portion of each of a plurality of signal emitting elements through at least one opening of a plurality of openings extending through a support surface configured to at least partially support the plurality of items having different shapes and sizes thereon; and
   wirelessly communicating, by at least one signal receiving member, with the at least a portion of each of the plurality of signal emitting elements extending through the at least one opening, wherein the plurality of openings are staggered and at least one spacer is positioned between adjacent openings, thereby enhancing the accuracy of a reading process of the at least one signal receiving member.

21. The method of claim 20, wherein at least one item of the plurality of items is at least one of the following: a flimsy item, a thin item, an item including at least one metallic component or portion, an item in a package, or any combination thereof.

22. An item tracking system, comprising:
   a plurality of signal emitting elements directly or indirectly attached to a portion of each of a plurality of items having different shapes or sizes, wherein at least a portion of each of the plurality of signal emitting elements extends from an associated item of the plurality of items; and
   a container, comprising:
      (i) a support surface configured to at least partially support the plurality of items and having a plurality of openings extending therethrough, the plurality of openings comprising at least two horizontal lanes, each horizontal lane of the at least two horizontal lanes comprising a subset of openings of the plurality of openings, wherein each opening of the plurality of openings is configured to at least partially receive at least a portion of each of the plurality of signal emitting elements therethrough, and wherein the plurality of openings are staggered;
      (ii) at least one signal receiving member configured to wirelessly communicate with at least one signal emitting member in at least one horizontal lane of the at least two horizontal lanes based at least partially on a detected presence of the at least one signal emitting element extending through at least one opening of the subset of openings of the at least one horizontal lane; and (iii) at least one spacer positioned between adjacent openings, thereby enhancing the accuracy of a reading process of the at least one signal receiving member.

23. The item tracking system of claim 22, further comprising at least one sensing arrangement configured to detect the presence of the at least one signal emitting element extending through the at least one opening of the subset of openings, wherein the at least one horizontal lane is interrogated only if the at least one signal emitting element is detected in the at least one horizontal lane.

\* \* \* \* \*